United States Patent

[11] 3,579,256

[72] Inventors Gerd Cyrener;
Joachim Fahrendholz, Frankfurt-Main-Seckbach, Germany
[21] Appl. No. 741,797
[22] Filed July 1, 1968
[45] Patented May 18, 1971
[73] Assignee Braun Aktiengesellschaft
Frankfurt, Main, Germany
[32] Priority June 30, 1967
[33] Germany
[31] B93256

[54] COMBINATION SUBCARRIER FILTER AND BIAS TRAP FOR MAGNETIC TAPE RECORDERS
4 Claims, 4 Drawing Figs.

[52] U.S. Cl. 179/100.2, 179/100.11
[51] Int. Cl. G11b 5/00
[50] Field of Search 179/100.2 (K); 127/100.2; 179/100.11

[56] References Cited
UNITED STATES PATENTS
3,300,590 1/1967 Cronin 179/100.2

*Primary Examiner*—J. Russell Goudeau
*Attorney*—Michael S. Striker

ABSTRACT: A recording amplifier receives audio frequency signals having additional undesired high frequency noise and furnishes corresponding amplified signals at a recording output. These are filtered by a low pass filter which passes the audio signals but rejects the high frequency noise. The output of the filter is directly connected to a premagnetization oscillator output and the recording head. Thus it also serves to decouple the premagnetization oscillator output from the recording amplifier, while permitting the full premagnetization oscillator output to be transmitted to the recording head.

INVENTOR
GERD CYRENER
BY JOACHIM FAHRENHOLZ
Michael S. Striker
ATTORNEY

INVENTOR
GERD CYRENER
BY JOACHIM FAHRENHOLZ
Michael S. Striker
ATTORNEY

COMBINATION SUBCARRIER FILTER AND BIAS TRAP FOR MAGNETIC TAPE RECORDERS

BACKGROUND OF THE INVENTION

This invention relates to tape recorders having recording amplifiers, premagnetization oscillators, recording heads and electronic filters.

In such a tape recorder a premagnetization oscillator furnishes an oscillator frequency signal at the oscillator output. In order to prevent this signal from being coupled to the recording amplifier, it is usual to connect a tuned absorption wave trap filter for rejecting the oscillator frequency between the recording amplifier and the premagnetization oscillator.

Furthermore, it has been found that when tape recordings are made of stereophonic broadcasts oscillations are generated by the heterodyning of the oscillator signal and harmonics of the subcarrier frequency present in the stereo broadcast signal. These oscillations result in disagreeable whistle tones especially when no modulation is present. In order to prevent formation of such whistle tones tuned absorption wave trap filtering means adapted to reject harmonics of the subcarrier frequency are connected in the decoding portion of the stereo receiver. These filtering means are, however, not always completely effective, thus permitting harmonics of the subcarrier frequency to reach the recording amplifier. These subcarrier frequency harmonics can pass the rejecting absorption wave trap filters tuned to the premagnetization oscillator frequency. The undesired whistle tones then result from the heterodyning of the harmonics of the subcarrier frequency that reach the output of the premagnetization oscillator and the premagnetization oscillator signal which is present there.

In conventional arrangement it has been attempted to prevent the formation of these whistle tones by inserting additional filters into the low frequency path between the stereo broadcast receiver and the tape recorder. These low pass filters are adapted to reject frequencies outside the audio range.

SUMMARY OF THE INVENTION

This invention comprises an arrangement for preventing unwanted noise in the tape recording of stereo broadcasts. It comprises a premagnetization oscillator having an oscillator output, and adapted to furnish an oscillator frequency signal at said oscillator output. It further comprises a recording amplifier having a recording input and a recording output, audio signals and unwanted high frequency signals being received at said recording input, a corresponding recording signal being furnished at said recording output. It also comprises a recording head for receiving said oscillator frequency signal and said recording signal. Filtering means are also furnished for rejecting said high frequency signals and said oscillator output signal, while passing said audio signals. Said filter means are directly connected to said recording output at a filter input terminal, and further directly connected to said oscillator output and said recording head at a filter end terminal. Thus the recording head continues to receive the full premagnetization oscillator output, while a coupling between the recording amplifier and the premagnetization oscillator output is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The preferred embodiment of this invention will now be discussed with reference to the FIGS.

Figure 1:
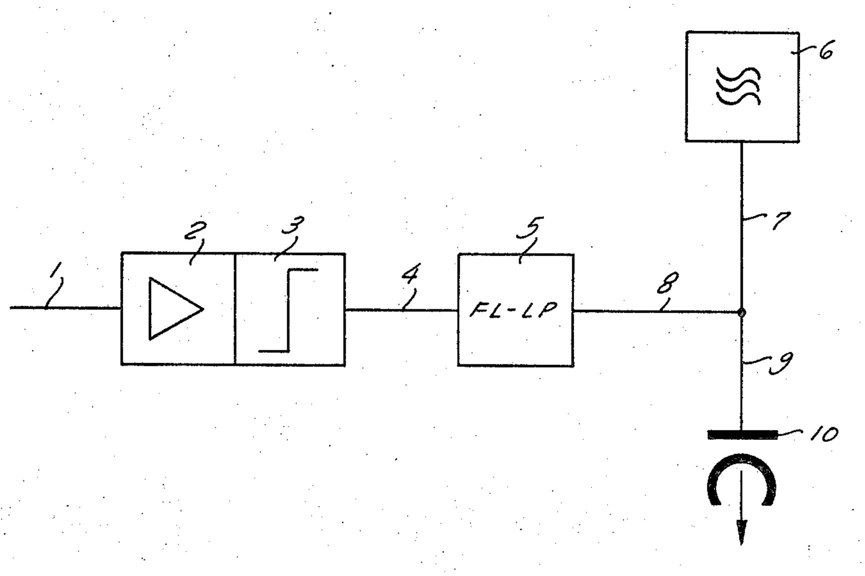
FIG. 1 is a block diagram of a tape recorder for recording stereo broadcast signals.

FIG. 1 shows the recording amplifier 2 having a recording input 1 to which the input signal, namely a desired audio signal having undesired higher frequency components is furnished. A compensating network 3, for removing distortion in the audio signal is connected in series with the recording amplifier. Filter means, here a low pass filter 5 are serially connected following the compensating network. The high frequency components of the input signal to the recording amplifier are, for example, the subcarrier frequency present during receipt of stereo broadcast signals and harmonics thereof. These frequencies are blocked by the filter 5, while the desired audio frequencies are allowed to pass. Also part of the tape recorder is a premagnetization oscillator 6 which furnishes an oscillator frequency output to line 7. This might in turn be mixed with the output of the recording amplifier, were it not for the filter 5 which also rejects this frequency. Thus the full output of the premagnetization oscillator 6 is available at the recording head 10 via conductors 7 and 9.

Figure 2:
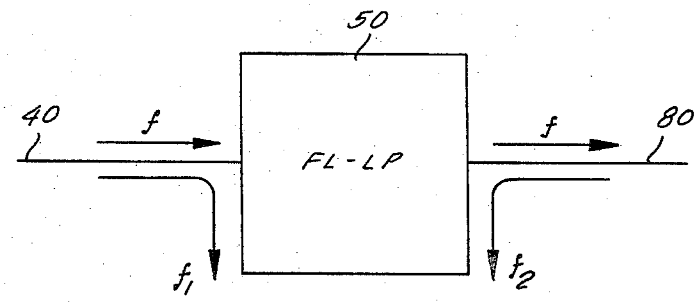
FIG. 2 is a block diagram of filtering means.

The filter means, denoted by numeral 5 in FIG. 1 are again shown in FIG. 2, where they are denoted by numeral 50. As is illustrated there, the frequency $f$ representing the desired audio frequency range of approximately 20 Hz. to 18 kHz. is transmitted through the filter, while the frequencies denoted $f_1$ are attenuated by the filter. For example, the subcarrier frequency of 38 kHz. is, as shown by the characteristic in FIG. 4, considerably attenuated, while harmonics of the subcarrier frequency as for example 76 kHz. are substantially completely suppressed. The premagnetization oscillator frequency, here assumed to be approximately 100 kHz., is also completely attenuated.

Figure 3:
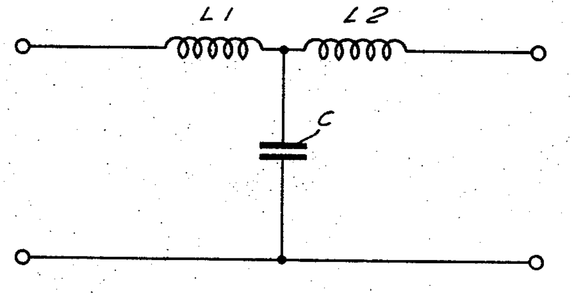
FIG. 3 is one embodiment of the filtering means of FIG. 2.

The filter in its simplest form is a low pass filter constructed in the conventional manner, as shown in FIG. 3. As reference to this FIG. shows, it is constructed of a capacitor C and two coils L1 and L2.

Figure 4:
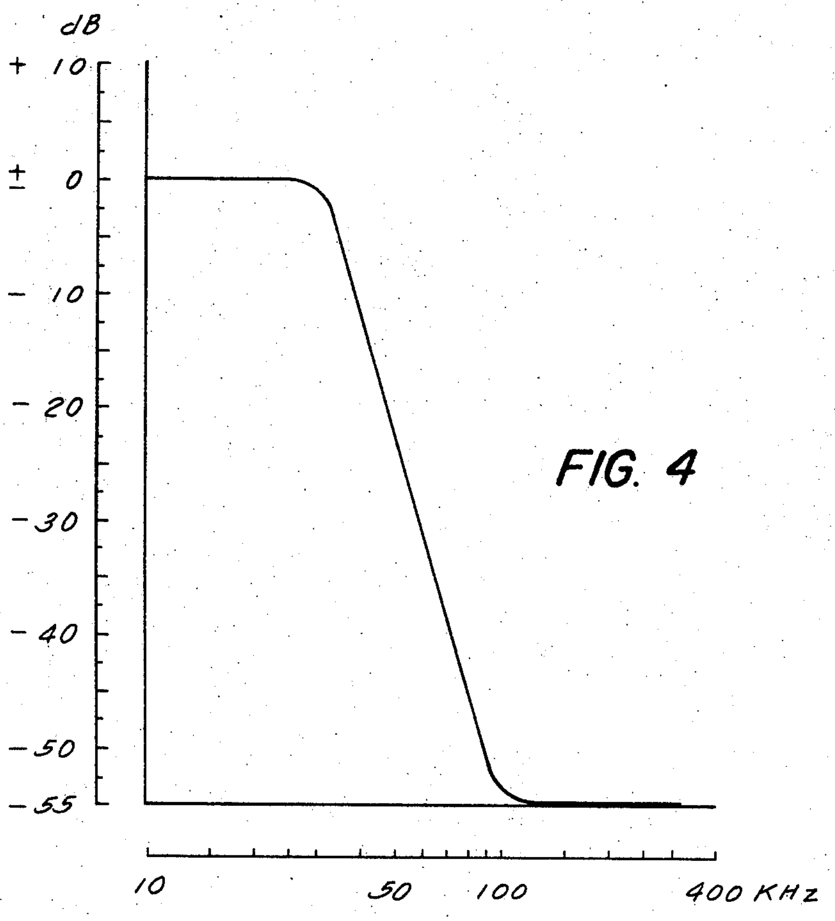
FIG. 4 is a curve showing the filter output as a function of frequency.

FIG. 4 shows the ratio of output voltage to input voltage in decibels for the filter of FIG. 3. Reference to the FIG. will show that through the above-mentioned audio range the filter introduces substantially zero attenuation, while for harmonics of the subcarrier frequency of stereo broadcasts, as well as for the premagnetization oscillator frequency attenuations of minus 50 db. can be achieved. It is a particular advantage of the arrangement according to this invention that a single filter of simple construction can completely eliminate the noises resulting from the presence of harmonics of the subcarrier frequency in the signal furnished to the recording amplifier and can also prevent heterodyning of the aforementioned harmonics and the premagnetization oscillator frequency signal.

While the invention has been illustrated and described as embodied in a low pass filter for removing harmonics of the subcarrier frequency of stereo broadcasts, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for reducing unwanted noise in tape recordings, comprising in combination, a premagnetization oscillator, having an oscillator output and adapted to furnish an oscillator frequency signal at said output; a recording amplifier having a recording input and a recording output, an input signal, having desired audio and undesired higher frequency components being furnished to said recording input, a recording signal corresponding to said input signal being furnished at said recording output; a recording head for receiving said oscillator frequency signal and said recording signal; low pass filter means passing signals of audio frequency and rejecting signals of all frequencies exceeding audio frequencies, said low pass filter means having at least one filter input terminal and one filter end terminal; means connecting said filter input terminal to said recording output; and direct connecting means directly connecting said filter end terminal, said oscillator output and said recording head.

2. An arrangement as set forth in claim 1, wherein said low pass filter means comprise a T section, having a first and second series inductance and a shunt capacitor.

3. An arrangement as set forth in claim 1, wherein said high frequency components of said recording amplifier input signal comprise signals of subcarrier frequency present during reception of stereo broadcasts, and harmonics thereof.

4. A system as set forth in claim 3 also comprising compensating circuit means connected between said recording amplifier and said filter means.